US012228106B2

(12) United States Patent
Møller Madsen et al.

(10) Patent No.: US 12,228,106 B2
(45) Date of Patent: Feb. 18, 2025

(54) TRANSPORT FRAME FOR A NACELLE OF A WIND TURBINE AND ASSOCIATED METHODS

(71) Applicant: Vestas Wind Systems A/S, Aarhus N (DK)

(72) Inventors: Niels Møller Madsen, Århus C (DK); Joris Kofman, Aalborg Øst (DK)

(73) Assignee: Vestas Wind Systems A/S, Aarhus N. (DK)

( * ) Notice: Subject to any disclaimer, the term of this patent is extended or adjusted under 35 U.S.C. 154(b) by 406 days.

(21) Appl. No.: 17/784,182

(22) PCT Filed: Dec. 18, 2020

(86) PCT No.: PCT/DK2020/050388
§ 371 (c)(1),
(2) Date: Jun. 10, 2022

(87) PCT Pub. No.: WO2021/136567
PCT Pub. Date: Jul. 8, 2021

(65) Prior Publication Data
US 2023/0024939 A1 Jan. 26, 2023

(30) Foreign Application Priority Data
Dec. 30, 2019 (DK) .............................. PA 2019 70838

(51) Int. Cl.
*F03D 13/40* (2016.01)
(52) U.S. Cl.
CPC ..................................... *F03D 13/40* (2016.05)
(58) Field of Classification Search
CPC ..................................... F03D 13/40; Y02E 10/72
See application file for complete search history.

(56) References Cited

U.S. PATENT DOCUMENTS

| 7,775,753 B2 * | 8/2010 | Pedersen ................. F03D 13/40 410/44 |
| 2008/0003088 A1 * | 1/2008 | Banta ........................ B60P 3/40 414/460 |

(Continued)

FOREIGN PATENT DOCUMENTS

| CN | 104875670 A | 9/2015 |
| EP | 1336755 A1 | 8/2003 |

(Continued)

OTHER PUBLICATIONS

Danish Patent and Trademark Office, Search and Examination Report in PA 2019 70838, Jul. 1, 2020.

(Continued)

*Primary Examiner* — Aaron R Eastman
(74) *Attorney, Agent, or Firm* — Wood Herron & Evans LLP

(57) ABSTRACT

A transport frame (100, 102) for a nacelle (14) includes a pair of lower nacelle mounts (128, 130) and a pair of upper nacelle mounts (204, 206). Each of the lower nacelle mounts (128, 130) includes a plurality attachment points for attaching to the nacelle (14) at a plurality of different widths. Each of the upper nacelle mounts (204, 206) includes a plurality of attachment points for attaching to the nacelle (14) at a plurality of different widths. The pair of lower nacelle mounts (128, 130) and the pair of upper nacelle mounts (204, 206) are adjustably positioned to allow the transport frame (100, 102) to attach to the nacelle (14) at a plurality of different heights. The ability of the transport frame (100, 102) to attach to the nacelle (14) at a plurality of different widths and heights allows the transport frame (100, 102) to be used on nacelles (14) having different sizes. Methods of using the transport frames (100, 102) are also disclosed.

23 Claims, 12 Drawing Sheets

(56) References Cited

U.S. PATENT DOCUMENTS

| | | | | |
|---|---|---|---|---|
| 2010/0111633 | A1* | 5/2010 | Pedersen | F03D 13/40 |
| | | | | 410/44 |
| 2011/0304122 | A1* | 12/2011 | Poulsen | F03D 80/00 |
| | | | | 416/244 R |
| 2022/0205269 | A1* | 6/2022 | Weiss | E04H 12/345 |
| 2022/0235741 | A1* | 7/2022 | Weiss | E04H 12/345 |

FOREIGN PATENT DOCUMENTS

| | | |
|---|---|---|
| EP | 2327655 A1 | 6/2011 |
| EP | 2395240 A1 | 12/2011 |
| FR | 3006958 A1 | 12/2014 |
| WO | 0204321 A2 | 1/2002 |
| WO | 2004101313 A1 | 11/2004 |
| WO | 2008104185 A1 | 9/2008 |

OTHER PUBLICATIONS

European Patent Office, International Search Report and Written Opinion in PCT/DK2020/050388, Mar. 29, 2021.

\* cited by examiner

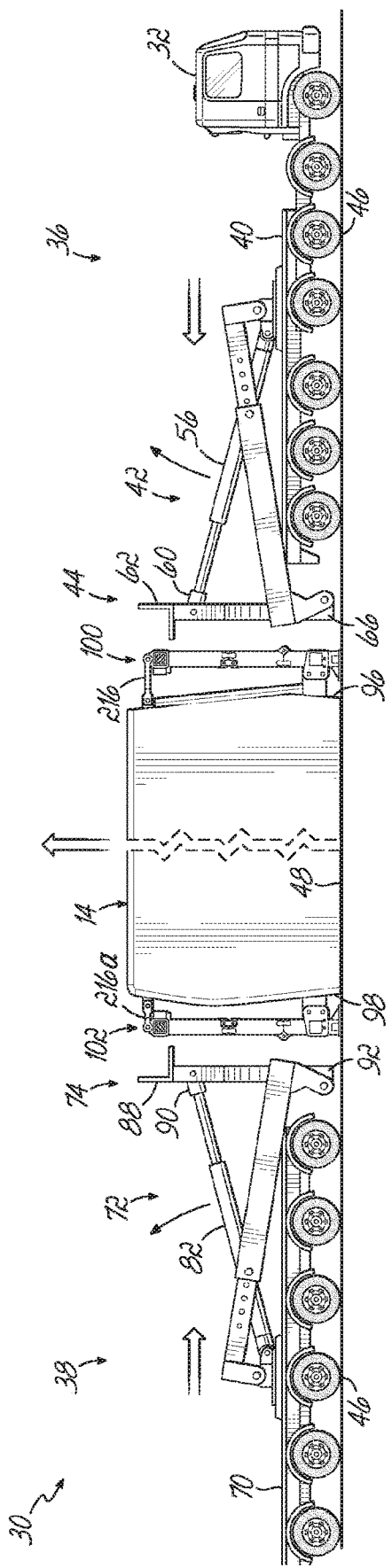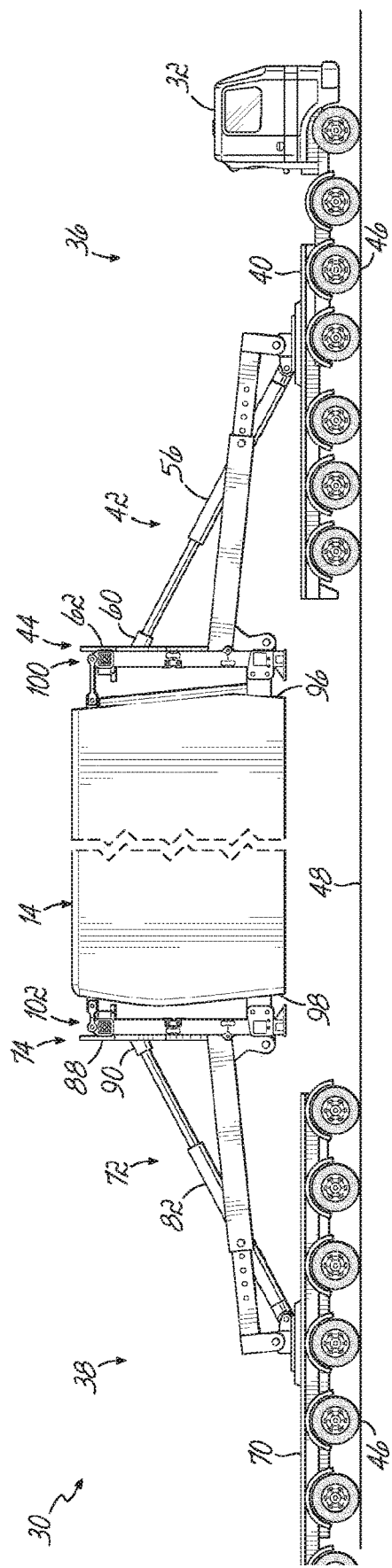
FIG. 3A
FIG. 3B

TRANSPORT FRAME FOR A NACELLE OF A WIND TURBINE AND ASSOCIATED METHODS

TECHNICAL FIELD

This invention relates generally to wind turbines, and more particularly to a transport frame attachable to the ends of a nacelle of the wind turbine that facilitates the transport and/or storage of nacelles having different sizes. The invention further relates to methods of using the transport frame to transport and/or store nacelles having different sizes.

BACKGROUND

Wind turbine generators are used to produce electrical energy using a renewable resource and without combusting a fossil fuel. A wind turbine generator converts kinetic energy from the wind into electrical energy, and includes a tower, a nacelle mounted atop the tower, a rotor hub rotatably supported by the nacelle, and a plurality of rotor blades attached to the hub. The hub is coupled to a generator housed inside the nacelle. Consequently, as wind forces the blades to rotate, electrical energy is produced by the generator.

In a typical on-shore wind turbine installation, various components of the wind turbine, such as the nacelle, tower or tower sections, rotor hub, rotor blades, etc., may be transported to the installation site separately and then assembled together on site so as to result in an operational wind turbine. Due to the relatively large size of some of these components, the transportation thereof is typically carried out using one or more tractor trailers which travel along the existing network of roads, highways, expressways, etc. (collectively referred to herein as roads) to the installation site. Additionally, for off-shore wind turbine installations, which can be significantly larger than on-shore installations, wind turbine components are typically transported using tractor trailers on the existing network of roads from a manufacturing facility to quayside where the components may be loaded onto boats for transport to the off-shore installation site.

In any event, the movement of various wind turbine components along the exiting network of roads is a very important aspect of wind turbine installation, especially as the size of wind turbine components continue to increase. More particularly, during the transport of a wind turbine component it may be necessary to manipulate the component being transported in order to safely navigate the roadways. For example, during the transport of some wind turbine components, it may be desirable to vary the height of the component in order to navigate beneath bridges and underpasses. Other obstacles may also exist that require the manipulation of the wind turbine component being transported over the roads.

One method of transporting wind turbine components to a desired installation site involves the use of a so-called "world adapter transport solution". Such a transport solution is the subject of assignee's U.S. Pat. No. 7,775,753. This transport solution mounts a removable transport frame to each of the forward and aft ends of the nacelle. The nacelle is then supported between a first forward trailer and a second aft trailer. The first trailer includes an attachment interface at its aft end which engages with the transport frame on the forward end of the nacelle, and the second trailer includes an attachment interface on its forward end which engages with the transport frame on the aft end of the nacelle. The first trailer is towed by a towing vehicle or tractor. Once the attachment interfaces on the trailers are engaged with the transport frames on the nacelle (or other wind turbine component such as a wind turbine tower section), lifting elements associated with trailers and attachment interfaces lift the nacelle up off the ground for transport. The lifting elements may be manipulated to raise/lower the nacelle as needed during the transport of the wind turbine component to the installation site. Upon delivery to the installation site the lifting elements may then lower the nacelle to the ground. Alternatively, the nacelle can be lifted and lowered by lifting and lowering the suspension systems of the two trailers.

While the world adaptor transport solution is effective for transporting large wind turbine components along the network of roads to an installation site, there are a number of drawbacks that manufacturers continually strive to improve upon. For example, because nacelles come in a variety of sizes, each nacelle size has transport frames dedicated solely to the particular size of nacelle. In other words, a transport frame is typically made to fit a particular size of nacelle and is not designed to fit nacelles of a different size. Accordingly, manufacturers have to maintain and store a large inventory of transport frames that fit the different sized nacelles. However, maintaining and storing such a large fleet of transport frames is costly and inefficient.

In addition to the above, current transport frames are rather large bulky items that require significant space when not in use. Thus, the transport frames take up significant space when being stored for future use. Moreover, after the transport frames are used to transport a wind turbine component to an installation site, the transport frames must be shipped back to the manufacturing facility for transport of another wind turbine component. The relatively large size of the transport frames, however, occupies considerable space and capacity in the return transport, thus increasing the costs associated with the use of the transport frames.

In view of the above drawbacks, manufacturers seek improved designs for transport frames that can be used on wind turbine components of different sizes, i.e., multi-dedicated transport frames. Additionally, manufacturers seek transport frame designs that are more compact during storage and transport (e.g., back to a manufacturing facility). Furthermore, manufacturers seek improved methods for transporting wind turbine components along a network of roads to a wind turbine installation site.

SUMMARY

A transport frame for the transport of a nacelle to a wind turbine installation site is disclosed. The transport frame includes a plurality of nacelle mounts for attaching the transport frame to the nacelle and includes a pair of lower nacelle mounts and a pair of upper nacelle mounts. Each of the lower nacelle mounts includes a plurality of lower attachment points for attaching the lower nacelle mounts to the nacelle. The plurality of lower attachment points on each of the lower nacelle mounts allows the transport frame to attach to the nacelle at a plurality of different widths. Each of the upper nacelle mounts includes a plurality of upper attachment points for attaching the upper nacelle mounts to the nacelle. The plurality of upper attachment points on each of the upper nacelle mounts allows the transport frame to attach to the nacelle at a plurality of different widths. The pair of lower nacelle mounts and the pair of upper nacelle mounts are adjustably positioned relative to each other on the transport frame to allow the transport frame to attach to the nacelle at a plurality of different heights. The ability of the transport frame to attach to the nacelle at a plurality of different widths and at a plurality of different heights allows the transport frame to be used on nacelles having different sizes.

In an exemplary embodiment, each of the pair of lower nacelle mounts includes a beam section and a plurality of mounting plates coupled to and spaced apart along the beam section. Mounting slots are formed between adjacent mounting plates that define the plurality of lower attachment points. The plurality of mounting plates may further include a lower array of aligned openings configured to receive a support pin for supporting the nacelle and an upper array of aligned openings configured to receive a lock pin for securing the lower nacelle mount to the nacelle. In one embodiment, each of the pair of lower nacelle mounts includes three or more mounting plates and two or more mounting slots. Additionally, each of the pair of lower nacelle mounts may be fixedly positioned on the transport frame.

In an exemplary embodiment, each of the upper nacelle mounts includes a beam section and a plurality of mounting plates coupled to and spaced apart along the beam section. Mounting slots are formed between adjacent mounting plates that define the plurality of upper attachment points. The plurality of mounting plates may further include a tab extending from an end of each of the plurality of mounting plates and an array of aligned openings in the tab of each of the plurality of mounting plates configured to receive a lock pin for securing the upper nacelle mount to the nacelle. In one embodiment, each of the pair of upper nacelle mounts includes three or more mounting plates and two or more mounting slots. In one embodiment, each of the pair of upper nacelle mounts is adjustably positioned on the transport frame. For example, each of the pair of upper nacelle mounts may be positioned on the transport frame in a first orientation where the pair of lower nacelle mounts and the pair of upper nacelle mounts are separated by a first height, and each of the pair of upper nacelle mounts may be positioned on the transport frame in a second orientation where the pair of lower nacelle mounts and the pair of upper nacelle mounts are separated by a second height different from the first height.

In one embodiment, the transport frame may further include a pair of tie rods, wherein each tie rod is configured to be coupled to a respective one of the pair of upper nacelle mounts for attaching the upper nacelle mounts to the nacelle. The length of the tie rod may be adjustable and may vary depending whether the transport frame is being attached to the front end or the rear end of the nacelle.

In a further aspect of the invention, the transport frame may be movable between an expanded state and a collapsed state. The transport frame may be in an in-use configuration and attached to the nacelle when in an expanded state. The transport frame may be in storage when in the collapsed state. The transport frame may also be in a collapsed state when being transported from a wind turbine installation site back to a manufacturing facility to be used on another nacelle. In one embodiment, the transport frame may include a plurality of frame sections hingedly coupled together to form the transport frame, wherein the transport frame is foldable at the hinge joints between adjacent frame sections to achieve the collapsed state. For example, the transport frame may include a bottom frame section, an intermediate frame section, and a top frame section. The bottom frame section may include a lower cross beam, wherein the pair of lower nacelle mounts are associated with the lower cross beam. The top frame section may include an upper cross beam, wherein the pair of upper nacelle mounts are associated with the upper cross beam. Each frame section may include a pair of main beams, wherein the main beams are coupled together at the joint between adjacent frame sections, such as at the hinged joints.

In one embodiment, the bottom frame section may be a production tool used in a manufacturing facility for the assembly of the nacelle. The intermediate frame section and the top frame section may be coupled to the bottom frame section after the assembly of the nacelle to ultimately form the transport frame. In addition, the transport frame may include one or more carrier interfaces for attachment to a transport system for transporting the nacelle to the wind turbine installation site. In one embodiment, the bottom frame section may include a lower carrier interface and the top frame section may include an upper carrier interface.

In another embodiment, a transport assembly includes a nacelle for a wind turbine having a front end and a rear end, a front transport frame attached to the front end of the nacelle, and a rear transport frame attached to the rear end of the nacelle. The front and rear transport frames may be as described above.

In a further embodiment, a transport system for transporting a nacelle over a network of roads to a wind turbine installation site includes a tractor and a trailer having a front carrier and a rear carrier, the front carrier attached to the tractor and including a front attachment interface, and the rear carrier including a rear attachment interface. The transport system further includes the assembly above having a nacelle and front and rear transport frames. The front attachment interface of the front carrier is attached to the front transport frame and the rear attachment interface of the rear carrier is attached to the rear transport frame.

In yet a further embodiment, a method of transporting a nacelle over a network of roads to a wind turbine installation site includes providing a front transport frame and a rear transport frame, each of the front and rear transport frames according to that described above; attaching the front transport frame to a front end of the nacelle; attaching the rear transport frame to a rear end of the nacelle; attaching the front and rear transport frames to a transport system; and transporting the nacelle to the wind turbine installation site.

In one embodiment, the method may further include attaching the front and rear transport frames to the front and rear ends of another nacelle, wherein the another nacelle has a size different from the nacelle. For example, the attachment of the another nacelle to the front and rear transport frames is at different attachment points of the lower and upper nacelle mounts as compared to the attachment of the nacelle to the attachment points of the lower and upper nacelle mounts of the front and rear transport frames.

In another embodiment, a method for transporting a nacelle over a network of roads to a wind turbine installation site includes providing a front transport frame, the front transport frame having an expanded state and a collapsed state; providing a rear transport frame, the rear transport frame having an expanded state and a collapsed state; attaching the front transport frame to a front end of the nacelle, the front transport frame being in the expanded state when attached to the nacelle; attaching the rear transport frame to a rear end of the nacelle, the rear transport frame being in the expanded state when attached to the nacelle; transporting the nacelle to the wind turbine installation site; removing the front and rear transport frames from the nacelle at the wind turbine installation site; and positioning the front and rear transport frames in the collapsed state.

In one embodiment, the method may further include transporting the front and rear transport frames away from the wind turbine installation site and back to a storage or manufacturing facility in the collapsed state. By way of example, the front and rear transport frames may each include a plurality of frame sections hingedly coupled together to form their respective transport frames, and wherein positioning the front and rear transport frames in the collapsed state further includes folding the front and rear transport frames at the hinge joints between adjacent frame sections.

In a further embodiment, a method of handling a nacelle for a wind turbine includes providing a pair of production tools at a manufacturing facility; assembling the nacelle at the manufacturing facility using the pair of production tools, one production tool being positioned at a front end of the nacelle and the other production tool being positioned at a rear end of the nacelle; coupling one or more frame sections to each of the pair of production tools, wherein the production tools and the one or more frame sections forming a front transport frame attached to the front end of the nacelle and a rear transport frame attached to the rear end of the nacelle; and transporting the nacelle to a wind turbine installation site using the front and rear transport frames.

In one embodiment, the method may further include placing the nacelle and production tools in storage and coupling the one or more frame sections to the production tools when the nacelle is ready for transport to the wind turbine installation site. Alternatively, the method may include coupling the one or more frame sections to the production tools before moving the nacelle to storage.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIGS. 3A and 3B are side elevation views of a transport system for transporting a nacelle to a wind turbine installation site in accordance with an embodiment of the invention;

DETAILED DESCRIPTION

Figure 1:
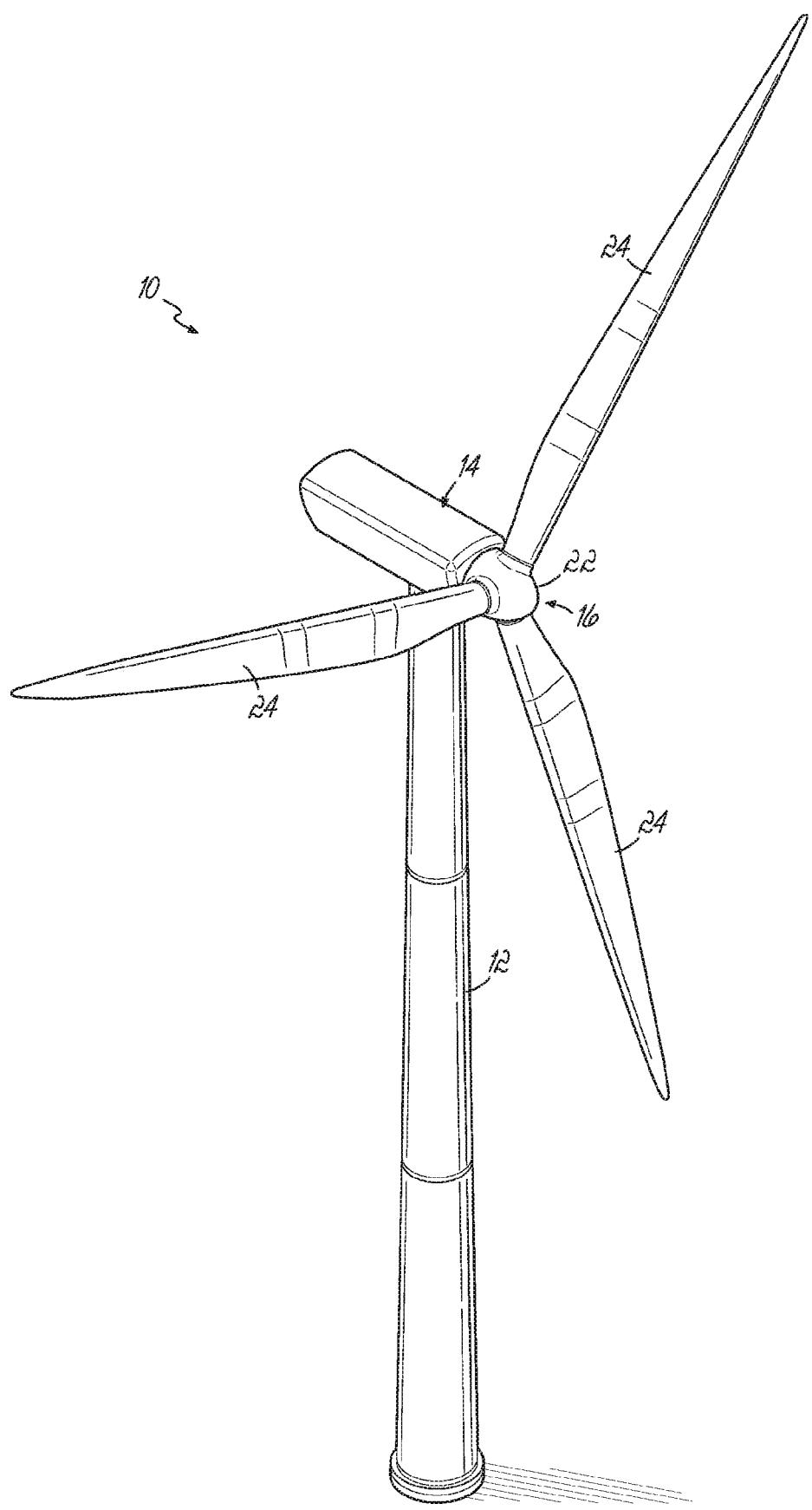
FIG. 1 is a front perspective view of a wind turbine.
Figure 2:
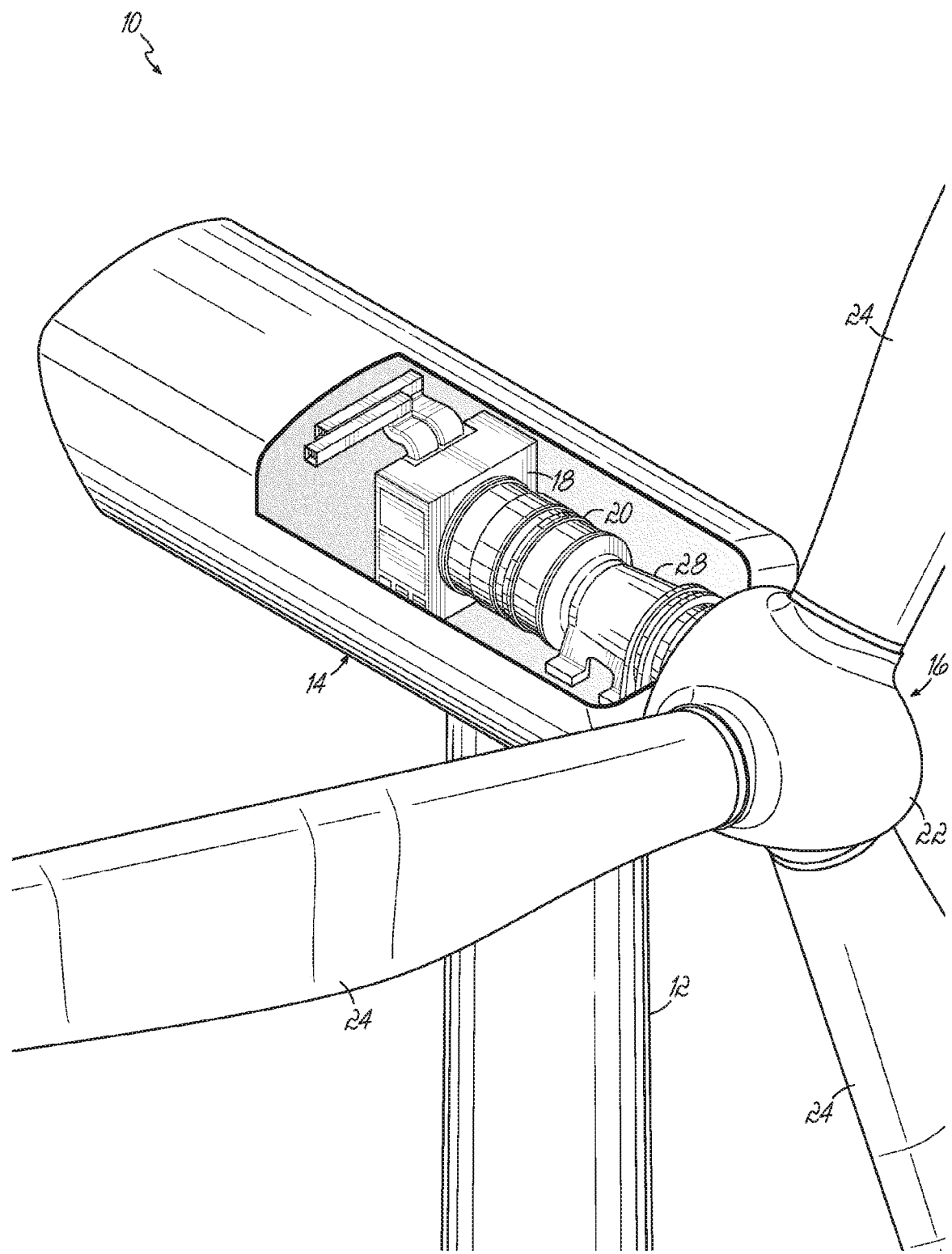
FIG. 2 is a perspective view, enlarged, of the nacelle and rotor hub of the wind turbine of FIG. 1.

With reference to FIGS. 1 and 2, a wind turbine 10 includes a tower 12, a nacelle 14 disposed at the apex of the tower 12, and a rotor 16 operatively coupled to a generator 18 via a gearbox 20 housed inside the nacelle 14. In addition to the generator 18 and gearbox 20, the nacelle 14 may house various components needed to convert wind energy into electrical energy and to operate and optimize the performance of the wind turbine 10. The tower 12 supports the load presented by the nacelle 14, rotor 16, and other wind turbine components housed inside the nacelle 14 and operates to elevate the nacelle 14 and rotor 16 to a height above ground level or sea level, as may be the case, at which air currents having lower turbulence and higher velocity are typically found.

The rotor 16 may include a central hub 22 and a plurality of blades 24 attached to the central hub 22 at locations distributed about the circumference of the central hub 22. In the representative embodiment, the rotor 16 includes three blades 24, however the number may vary. The blades 24, which project radially outward from the central hub 22, are configured to interact with passing air currents to produce rotational forces that cause the central hub 22 to spin about its longitudinal axis. The design, construction, and operation of the blades 24 are familiar to a person having ordinary skill in the art of wind turbine design and may include additional functional aspects to optimize performance. For example, pitch angle control of the blades 24 may be implemented by a pitch control mechanism (not shown) responsive to wind velocity to optimize power production in low wind conditions, and to feather the blades if wind velocity exceeds design limitations.

The rotor 16 may be coupled to the gearbox 20 directly or, as shown, indirectly via a main shaft extending between the hub 22 and the gearbox 20. The main shaft rotates with the rotor 16 and is supported within the nacelle 14 by a main bearing support 28 which supports the weight of the rotor 16 and transfers the loads on the rotor 16 to the tower 12. The gearbox 20 transfers the rotation of the rotor 16 through a coupling to the generator 18. Wind exceeding a minimum level may activate the rotor 16, causing the rotor 16 to rotate in a direction substantially perpendicular to the wind, applying torque to the input shaft of the generator 18. The electrical power produced by the generator 18 may be supplied to a power grid (not shown) or an energy storage system (not shown) for later release to the grid as understood by a person having ordinary skill in the art. In this way, the kinetic energy of the wind may be harnessed by the wind turbine 10 for power generation.

FIGS. 3A and 3B illustrate a transport system, generally shown at 30, in accordance with one embodiment of the invention for transporting a nacelle 14 along a network of roads. In an exemplary embodiment, the transport system 30 may take the form of a tractor trailer having a tractor 32 and a trailer configured to carry the nacelle 14 in in a manner described in more detail below. The trailer has a two-part design including a front carrier 36 and a rear carrier 38. The front carrier 36 includes a fixed frame 40, a movable frame 42, and a front attachment interface 44 associated with the movable frame 42. The fixed frame 40 is mountable to the tractor 32 at a front end thereof by conventional means, and further includes a plurality of wheels 46 rotatably mounted thereto for supporting at least a portion of the weight of the nacelle 14 on the road 48.

The movable frame 42 includes a front end movably coupled to the fixed frame 40. For example, the movable frame 42 may be pivotally coupled to the fixed frame 40, such as along a pivot axis (e.g., into the page). In this way, the movable frame 42 may rotate about the pivot axis between a lowered position, wherein a rear end of movable frame 42 is adjacent the road 48, and a raised position, wherein the rear end of movable frame 42 has been raised generally vertically with respect to the road 48.

To facilitate the movement of movable frame 42 relative to the fixed frame 40, the front carrier 36 may include a first or primary lift actuator 56 having a front end pivotally coupled to the fixed frame 40, and a rear end that terminates in an attachment element 62. The primary lift actuator 56 is capable of moving between a collapsed position and an extended position when actuated. The primary lift actuator 56 may take the form of an electric actuator, a hydraulic actuator, a pneumatic actuator, or other types of actuators suitable for the present purposes as known to those of ordinary skill in the art. The front carrier 36 may further include a secondary lift actuator (not shown) to facilitate movement of the movable frame 42 relative to the fixed frame 40. The secondary lift actuator may be coupled to the movable frame 42 and is similarly configured to move between a collapsed position and an extended position when actuated. The rear end of the movable frame 42 may include one or more attachment elements 66. The attachment elements 62, 66 collectively form the front attachment interface 44. Such carriers 36 and movable frames 42 are generally known by those of ordinary skill in the art and a further description will not be provided herein.

The rear carrier 38 has a similar construction and includes a fixed frame 70, a movable frame 72, and a rear attachment interface 74 associated with the movable frame 72. The fixed frame 70 includes a plurality of wheels 46 rotatably mounted thereto for supporting at least a portion of the weight of the nacelle 14 on the road 48. The movable frame 72 includes a rear end movably coupled to the fixed frame 70. For example, the movable frame 72 may be pivotally coupled to the fixed frame 70, such as along a pivot axis (e.g., into the page). In this way, the movable frame 72 may rotate about the pivot axis between a lowered position, wherein a front end of movable frame 72 is adjacent the road 48, and a raised position, wherein the front end of movable frame 72 has been raised generally vertically with respect to the road 48.

To facilitate the movement of movable frame 72 relative to the fixed frame 70, the rear carrier 38 may include a first or primary lift actuator 82, similar to actuator 56, having a rear end pivotally coupled to the fixed frame 70 and a front end that terminates in an attachment element 88. The primary lift actuator 82 is capable of moving between a collapsed position and an extended position when actuated. The rear carrier 38 may further include a secondary lift actuator (not shown) to facilitate movement of the movable frame 72 relative to the fixed frame 70. The secondary lift actuator is coupled to the movable frame 72 and is similarly configured to move between a collapsed position and an extended position when actuated. The front end of the movable frame 72 may include one or more attachment elements 92. The attachment elements 88, 92 collectively form the rear attachment interface 74. Such carriers 38 and movable frames 72 are generally known by those of ordinary skill in the art and a further description will not be provided herein.

As illustrated in FIGS. 3A and 3B, the attachment interfaces 44, 74 of the front and rear carriers 36, 38 are configured to be connected to the front and rear ends 96, 98 of the nacelle 14, respectively. To facilitate this connection, the transport system 30 includes a front transport frame 100 and a rear transport frame 102. The front transport frame 100 is configured to connect to the front end 96 of the nacelle 14 and to connect to the attachment interface 44 associated with the front carrier 36 of the transport system 30. Similarly, the rear transport frame 102 is configured to connect to the rear end 98 of the nacelle 14 and to connect to the attachment interface 74 associated with the rear carrier 38 of the transport system 30. In an advantageous aspect of the invention, the transport frames 100 and 102 are configured to have a multi-dedicated, modular design. More particularly, the transport frames 100, 102 are configured to be nearly identical to each other such that the same transport frame may be interchangeably used on either the front end 96 of the nacelle 14 or the rear end 98 of the nacelle 14. Accordingly, a field technician does not have to worry about whether a particular transport frame is attached to the proper end of the nacelle 14. Additionally, and perhaps more germane to the present disclosure, the transfer frames 100, 102 are configured to be connectable to nacelles having different sizes. These two above-identified features allow manufacturers and transporters of wind turbine components, such as wind turbine nacelles, to maintain and store an inventory of only one type of transport frame. Furthermore, the transport frames 100, 102 are configured to have a compact design when not in use for transporting a nacelle. This allows efficient storage of the transport frames not only during time periods when the frames are not in use at the manufacturing facility, but also during the return transport of the frames from the installation site back to the manufacturing facility. The transport frames will now be described in further detail.

Figure 4:
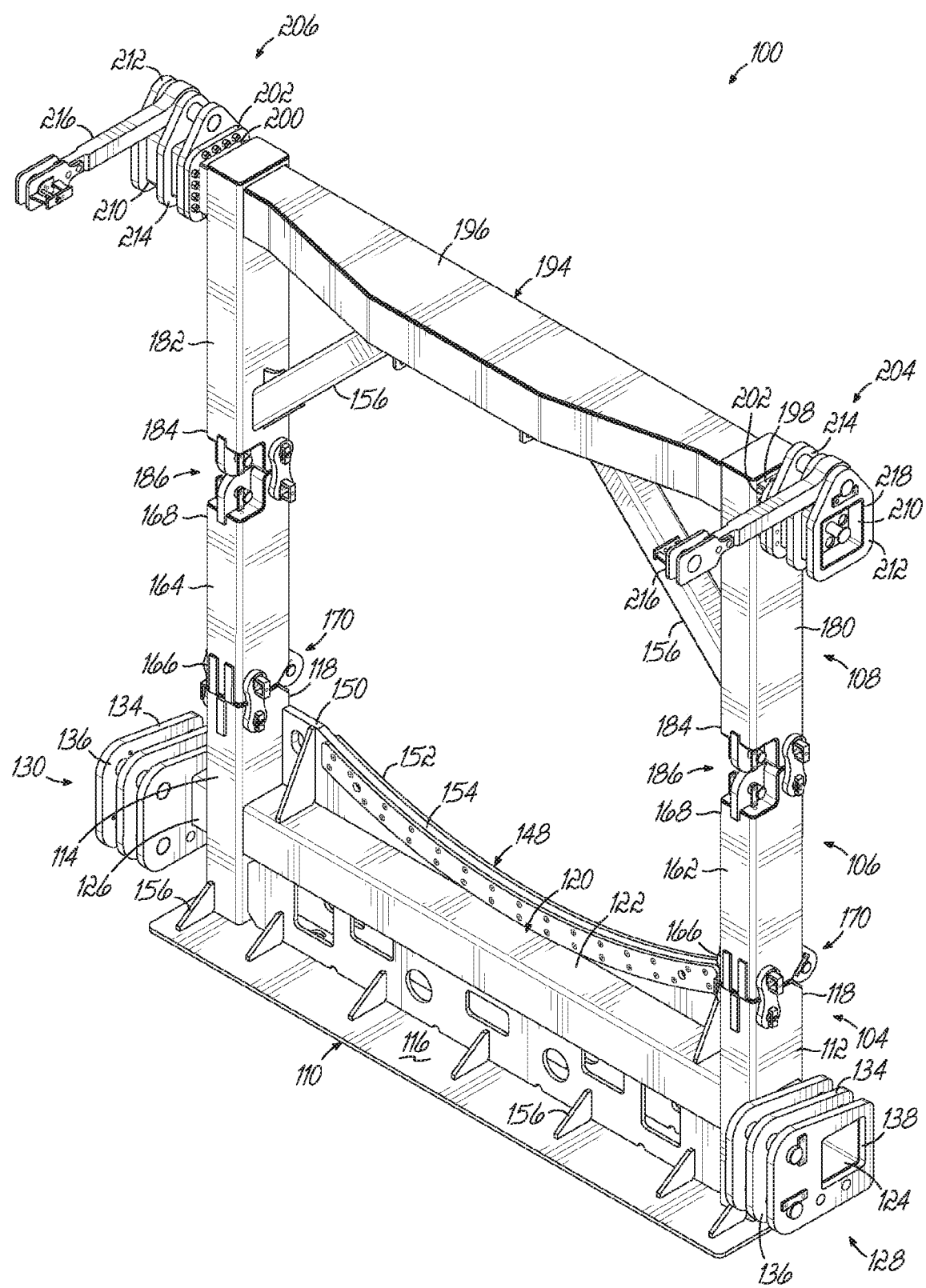
FIG. 4 is a perspective view of a transport frame in accordance with an embodiment of the invention.
Figure 5:
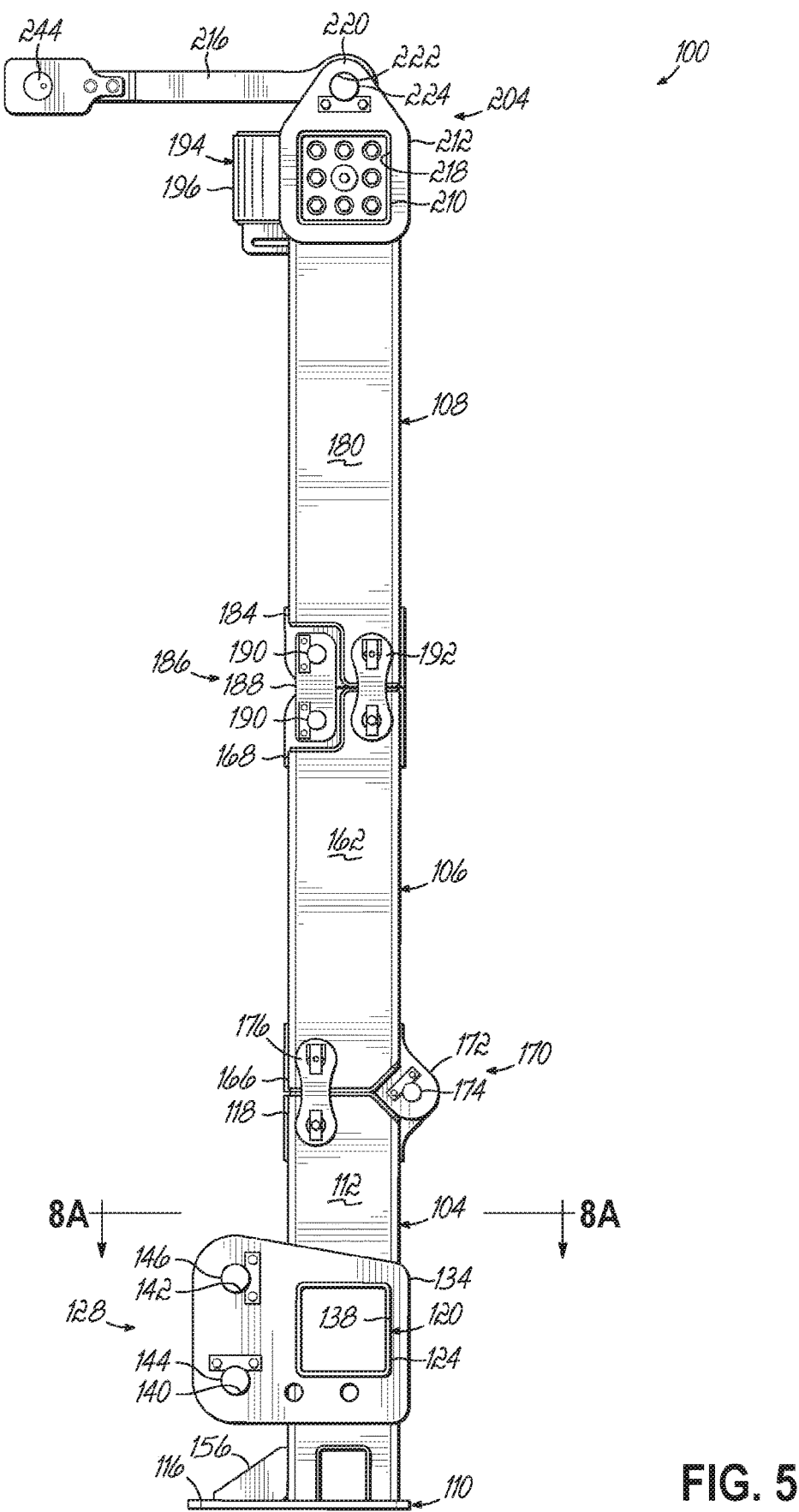
FIG. 5 is a side elevation view of the transport frame shown in FIG. 4.

As noted above, the front and rear transport frames 100, 102 are nearly identical to each other. Accordingly, only the front transport frame 100 will be described in detail. It should be understood, however, that the rear transport frame 102 has a similar construction and description. Any differences between the front and rear transport frames 100, 102 will be noted. As illustrated in FIGS. 4 and 5, the transport frame 100 has a multi-sectional design including a bottom frame section 104, an intermediate frame section 106, and a top frame section 108 coupled to each other to form the transport frame 100. While in an exemplary embodiment the transport frame 100 may include three frame sections, it should be realized that the transport frame 100 may be comprised of more or less frame sections and remain within the scope of the present disclosure.

The bottom frame section 104 includes a base support 110, which in an exemplary embodiment may take the form of a generally rectangular base plate, configured to support the transport frame 100 on the ground or other support surface. Two generally vertical and spaced apart main beams 112, 114 extend from an upper surface 116 of the base support 110 with each terminating at an upper connecting end 118. In an exemplary embodiment, the main beams 112, 114 may be formed from generally rectangular tubular steel beam stock. However, other types, materials, and configurations of the main beams 112, 114 may also be possible. The base support 110 further includes a lower cross beam 120 that extends between and beyond the main beams 112, 114 and which is generally parallel to the base support 110. In an exemplary embodiment, the lower cross beam 120 may be formed from a generally square or rectangular tubular steel beam stock. However, other types, materials, and configurations of the lower cross beam 120 may be possible. In one embodiment, the lower cross beam 120 is a monolithic beam section that extends through openings formed in the main beams 112, 114 and is welded or otherwise secured to the main beams 112, 114. Alternatively, the lower cross beam 120 may be formed by three discrete sections which are arranged relative to the main beams 112, 114 and secured thereto to form the lower cross beam 120. In any event, the lower cross beam 120 includes an inboard cross beam section 122 between the two main beams 112, 114 and a pair of outboard cross beam sections 124, 126 on the outside of the main beams 112, 114.

Figure 6A:
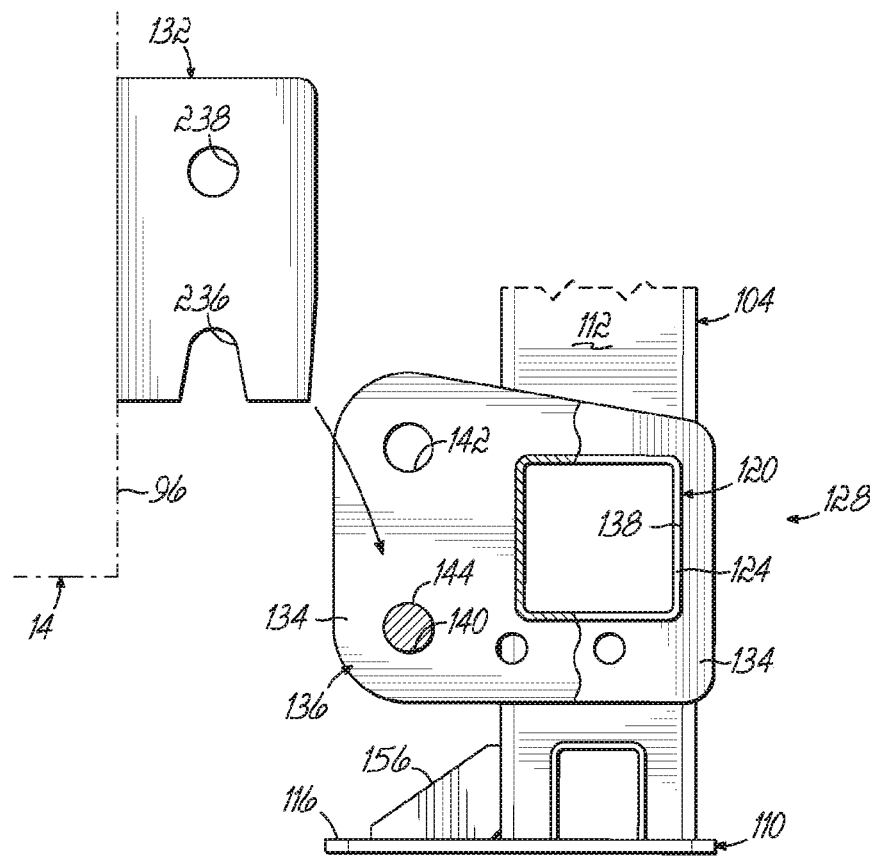
FIGS. 6A and 6B are side elevation views of a nacelle connecting to lower nacelle mounts on the transport frame shown in FIG. 4.
Figure 6B:
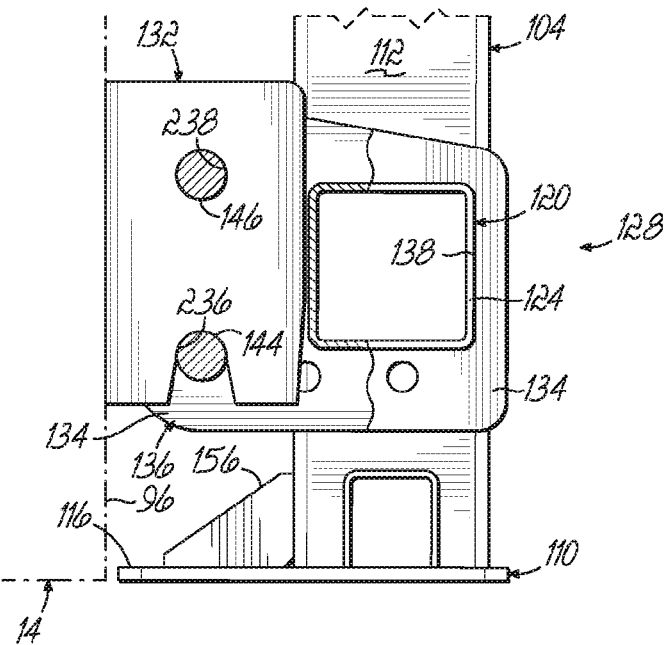

The outboard cross beam sections 124, 126 of the cross beam 120 includes lower nacelle mounts 128, 130 configured to connect to lower nacelle tangs 132 (see FIGS. 6A and 6B) on the nacelle 14. The lower nacelle mounts 128, 130 are substantially identical and only lower nacelle mount 128 will be described in detail. It should be understood, however, that nacelle mount 130 has a similar construction and description. In an exemplary embodiment, the lower nacelle mount 128 includes a plurality of mounting plates 134 spaced apart along the outboard cross beam section 124 and which define a series of mounting slots 136 between adjacent mounting plates 134. As explained in more detail below, the mounting slots 136 are configured to receive a nacelle tang 132 therein and operate as attachment points for coupling to the nacelle 14. The size of the nacelle 14 will dictate into which mounting slot 136 the nacelle tang 132 will be received. While three mounting plates 134 (and two mounting slots 136) are shown, it should be recognized that additional mounting plates 134 and mounting slots 136 may be provided on each of the nacelle mounts 128, 130. In one embodiment, the mounting plates 134 have a trapezoidal shape with a square or rectangular opening 138 configured to receive the outboard cross beam section 124 therein. The mounting plates 134 may be formed from steel and can be welded or otherwise secured to the outboard cross beam section 124. The wider end of the trapezoidal plates 134 may be arranged to confront the nacelle 14 and include a lower array of aligned openings 140 through the mounting plates 134 and an upper array of aligned openings 142 through the mounting plates 134. As explained in more detail below, the upper and lower arrays of openings 140, 142 are configured to receive respective pins 144, 146 for locking and supporting the nacelle tang 132 to the nacelle mount 128.

In addition to the above, the bottom frame section 104 includes a lower carrier interface 148 configured to connect to one of the carriers 36, 38 of the transport system 30 described in detail above. In an exemplary embodiment, the lower carrier interface 148 includes a lower carrier interface plate 150 that extends between the main beams 112, 114 and is positioned above the lower cross beam 120. By way of example, the lower carrier interface plate 150 may abut the lower cross beam 120. The lower carrier interface plate 150 may be formed from steel and be welded or otherwise secured to the main beams 112, 114 and/or lower cross beam 120. The position of the lower carrier interface plate 150 may be immediately adjacent the side of the main beams 112, 114 that confronts the carrier 36, 38 during transport. In one embodiment, an upper edge 152 of the carrier interface plate 150 may include a generally arcuate surface 154 for mating to the one or more attachment elements of the attachment interface 44, 74 of the respective carriers 36, 38 of the transport system 30.

Furthermore, to provide additional strength and integrity to the bottom frame section 104 and to the transport frame 100 in general, the bottom frame section 104 may include one or more stiffening elements 156. By way of example, a pair of stiffening plates 156 may be positioned between the inboard cross beam section 122 and the base support 110 to provide additional support to the lower cross beam 120. Additionally, a number of gusset plates 156 (e.g., triangular gusset plates) may be coupled to the base support 110 and the main beams 112, 114; the base support 110 and the stiffening plates 156 beneath the inboard cross beam section 122; and/or the lower carrier interface plate 150 and the inboard cross beam section 122.

The intermediate frame section 106 includes two generally vertical and spaced apart main beams 162, 164 with each terminating at a lower connecting end 166 and an upper connecting end 168. In an exemplary embodiment, the main beams 162, 164 may be formed from generally rectangular tubular steel beam stock similar to main beams 112, 114 described above. However, other types, materials, and configurations of the main beams 162, 164 may also be possible. The lower connecting ends 166 of the main beams 162, 164 are configured to be coupled to the upper connecting ends 118 of the main beams 112, 114 of the bottom frame section 104. For reasons explained in more detail below, the main beams 162, 164 of the intermediate frame section 106 may be coupled to the main beams 112, 114 of the bottom frame section 104 by a hinged connection 170. More particularly, the lower connecting end 166 of the main beams 162, 164 are connected to the upper connecting ends 118 of the main beams 112, 114 by a pivot 172 (defined by respective ears on the main beams 112, 114, 162, 164) that allows relative rotational movement between the intermediate frame section 106 and the bottom frame section 104 about hinge or pivot axis 174. In one embodiment, the hinged connection 170 may be positioned on the side of the transport frame 100 that confronts the carriers 36, 38 (i.e., in a direction away from the nacelle 14 when the transport frame 100 is coupled thereto) as illustrated in the figures.

The hinged connection 170 may further include one or more selectively engageable locks 176. When the lock 176 is engaged, relative rotations between the intermediate frame section 106 and the bottom frame section 104 about pivot axis 174 are prohibited and the main beams 112, 114 are firmly secured to main beams 162, 164, respectively. On the other hand, when the lock 176 is disengaged, relative rotations between the intermediate frame section 106 and the bottom frame section 104 about pivot axis 174 are permitted. As discussed in more detail below, this allows the transport frame 100 to be collapsed during periods of non-use. In one embodiment, the lock 176 may be positioned on the side of the transport frame 100 opposite to the pivot 172 (e.g., on the side that confronts the nacelle 14) and on the outer side and/or the inner side of the main beams 112, 162 and 114, 164. The locks 176 may be selectively engaged and disengaged manually, such as by a field technician or the like.

The top frame section 108 includes two generally vertical and spaced apart main beams 180, 182 with each terminating at a lower connecting end 184. In an exemplary embodiment, the main beams 180, 182 may be formed from generally rectangular tubular steel beam stock similar to main beams 112, 114 described above. However, other types, materials, and configurations of the main beams 180, 182 may also be possible.

The lower connecting ends 184 of the main beams 180, 182 are configured to be coupled to the upper connecting ends 168 of the main beams 162, 164 of the intermediate frame section 106. For reasons explained in more detail below, the main beams 180, 182 of the top frame section 108 may be coupled to the main beams 162, 164 of the intermediate frame section 106 by a hinged connection 186. More particularly, the lower connecting end 184 of the main beams 180, 182 are connected to the upper connecting ends 168 of the main beams 162, 164 by a pivot 188 (defined by a pivot linkage coupled to the main beams 162, 164, 180, 182) that allows relative rotational movement between the top frame section 108 and the intermediate frame section 106 about hinge or pivot axes 190. In one embodiment, the hinged connection 186 may be positioned on the side of the transport frame 100 that confronts the nacelle 14 (i.e., on the side opposite to the hinged connection 170) as illustrated in the figures.

The hinged connection 186 may further include one or more selectively engageable locks 192. When the lock 192 is engaged, relative rotations between the top frame section 108 and the intermediate frame section 106 about pivot axes 190 are prohibited and the main beams 180, 182 are firmly secured to main beams 162, 164, respectively. On the other hand, when the lock 192 is disengaged, relative rotations between the top frame section 108 and the intermediate frame section 106 about pivot axes 190 are permitted. As discussed in more detail below, this allows the transport frame 100 to be collapsed during periods of non-use. In one embodiment, the lock 192 may be positioned on the side of the transport frame 100 opposite to the pivot 188 (e.g., on the side that confronts the carriers 36, 38) and on the outer side and/or inner side of the main beams 162, 180 and 164, 182. The locks 192 may be selectively engaged and disengaged manually, such as by a field technician or the like.

The top frame section 108 further includes an upper cross beam 194 that extends between and beyond the main beams 180, 182 and which is generally parallel to the base support 110 and lower cross beam 120. In an exemplary embodiment, the upper cross beam 194 may be formed from a generally square or rectangular tubular steel beam stock. However, other types, materials, and configurations of the upper cross beam 194 may be possible. In one embodiment, the upper cross beam 194 is a monolithic beam section that extends through openings formed in the main beams 180, 182 and are welded or otherwise secured to the main beams 180, 182. Alternatively, the upper cross beam 194 may be formed by three discrete sections which are arranged relative to the main beams 180, 182 and secured thereto to form the upper cross beam 194. In any event, the upper cross beam 194 includes an inboard cross beam section 196 between the two main beams 180, 182 and a pair of outboard cross beam sections 198, 200 on the outside of the main beams 180, 182.

The outboard cross beam sections 198, 200 of the upper cross beam 194 includes attachment flanges 202 for selective mounting of upper nacelle mounts 204, 206 configured to connect to upper nacelle tangs 208 (see FIGS. 8A-8C) on the nacelle 14. By way of example, the upper nacelle mounts 204, 206 may be coupled to attachment flanges 202 by fasteners such as bolts. Other types of connections, however, may also be possible. The upper nacelle mounts 204, 206 are substantially identical and only mount 204 will be described in detail. It should be understood, however, that nacelle mount 206 has a similar construction and description. In an exemplary embodiment, the upper nacelle mount 204 includes a central beam 210 and a plurality of mounting plates 212 spaced apart along the central beam 210 and which define a series of mounting slots 214 between adjacent mounting plates 212. As explained in more detail below, the mounting slots 214 are configured to receive a tie rod 216 for connecting to the upper nacelle tangs 208 and operate as attachment points for coupling to the nacelle 14. The size of the nacelle 14 will dictate into which mounting slot 214 the tie rod 216 will be received. While three mounting plates 212 (and two mounting slots 214) are shown, it should be recognized that additional mounting plates 212 and mounting slots 214 may be provided on each of the nacelle mounts 204, 206. In one embodiment, the mounting plates 212 have a pentagonal shape with a square or rectangular opening 218 configured to receive the central beam 210 therein and a tab 220 extending from one side. The mounting plates 212 may be formed from steel and can be welded or otherwise secured to the central beam 210. In one embodiment, the tabs 220 of the mounting plates 212 may be arranged to extend upwardly from the central beam 210 and include an array of aligned openings 222 through the mounting plates 212. As explained in more detail below, the array of openings 222 is configured to receive a pin 224 for locking and supporting the tie rod 216 to the upper nacelle mount 204.

In addition to the above, the top frame section 108 includes an upper carrier interface configured to connect to one of the carriers 36, 38 of the transport system 30 described in detail above. In an exemplary embodiment, the upper carrier interface is similar to the lower carrier interface 148 and includes an upper carrier interface plate that extends between the main beams 180, 182 and is positioned below the upper cross beam 194. By way of example, the upper carrier interface plate may abut the upper cross beam 194. The upper carrier interface plate may be formed from steel and be welded or otherwise secured to the main beams 180, 182 and/or upper cross beam 194. The position of the upper carrier interface plate may be immediately adjacent the side of the main beams 180, 182 that confronts the carrier 36, 38 during transport. In one embodiment, a lower edge of the upper carrier interface plate may include a generally arcuate surface for mating to the one or more attachment elements of the attachment interface 44, 74 of the respective carriers 36, 38 of the transport system 30.

Furthermore, to provide additional strength and integrity to the top frame section 108 and to the transport frame 100 in general, the top frame section 108 may include one or more stiffening elements 156. By way of example, a pair of stiffening bars 156 may be positioned between the inboard cross beam section 196 and the main beams 180, 182 to provide additional support to the upper cross beam 194. Other stiffening elements (e.g., gusset plates, etc.) may also be used to strengthen the top frame section 108.

With the transport frames 100, 102 described as above, use of the transport frames for transporting a nacelle 14 will now be described in detail. As an initial step, the transport frames 100, 102 may be assembled such that the bottom frame section 104, intermediate frame section 106 and top frame section 108 are coupled together to form the assembled transport frames 100, 102. Next, the front transport frame 100 may be coupled to the front end 96 of the nacelle 14 and the rear transport frame 102 may be coupled to the rear end 98 of the nacelle 14. Again, the front and rear transport frames 100, 102 are substantially identical and are interchangeable between being coupled to the front or rear ends of the nacelle 14. The coupling of the transport frames 100, 102 to the nacelle 14 may be performed simultaneous or in a serial manner. In any event and in reference to FIGS. 6A and 6B, the lower nacelle tangs 132 are attached to and extend away from the front end 96 and rear end 98 of the nacelle 14. In an exemplary embodiment, the lower nacelle tangs 132 include a lower slot 236 open to a lower edge of the tang 132 and an upper opening 238. The support pin 146 may be positioned in the lower array of openings 140 in the lower nacelle mounts 128, 130 and locked into place. The nacelle 14 may be lifted by a crane or other lifting apparatus (not shown) and then lowered such that the support pins 146 are received in the lower slot 236 of the lower nacelle tangs 132. Thus, the lower nacelle tangs 132 rest on and are supported by the lower support pins 146 in the lower nacelle mounts 128, 130. Once the lower nacelle tangs 132 engage the support pins 146, the lock pin 144 may be positioned in the upper array of openings 142 so as to extend through the upper opening 238 in the lower nacelle tangs 132. This secures the lower nacelle tangs 132 of the nacelle 14 to the lower nacelle mounts 128, 130 of the transport frames 100, 102.

Figure 7A:
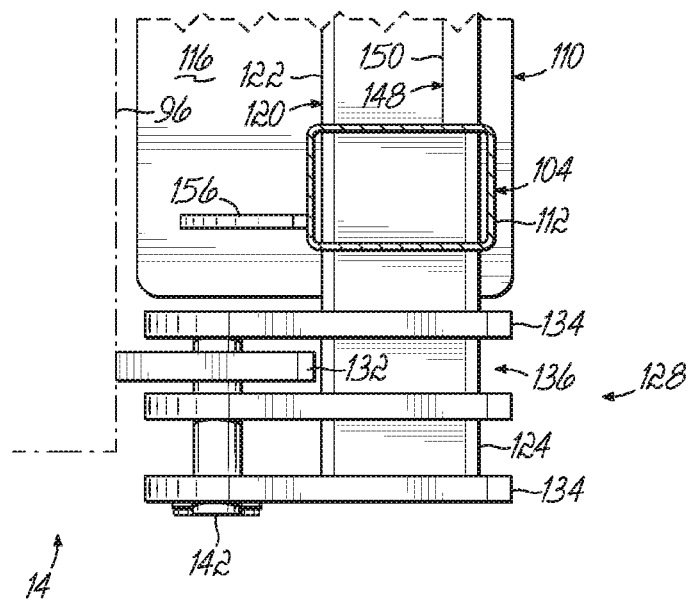
FIGS. 7A and 7B illustrate top views of the connection of a nacelle to the lower nacelle mounts of the transport frame at different widths.
Figure 7B:
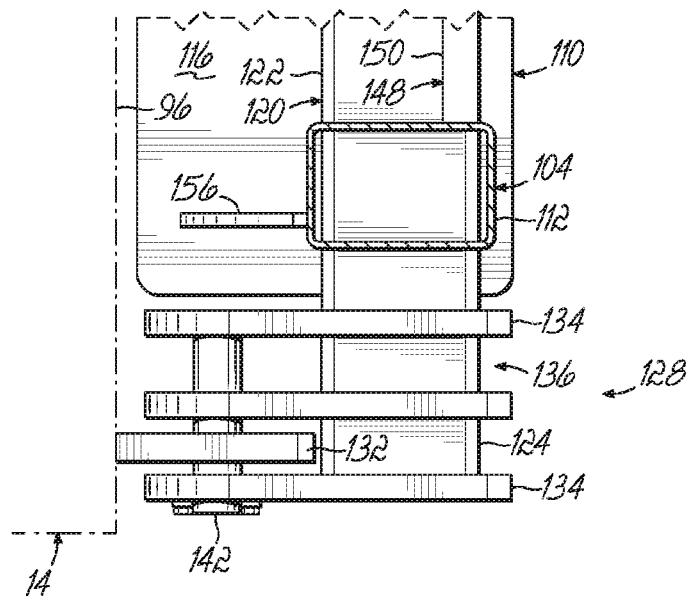

In an advantageous aspect of the present invention, the transport frames 100, 102 are configured to be used on nacelles of different sizes. More particularly, the lower nacelle tangs 132 will generally be spaced apart by a width that varies depending on the size of the nacelle 14. For example, a first nacelle of a first size will generally have the lower nacelle tangs 132 separated by a first width, and a second nacelle larger than the first nacelle will generally have the lower nacelle tangs 132 separated by a second width larger than the first width. The lower nacelle mounts 128, 130 are configured to accommodate the different widths of the nacelles. By way of example, in one embodiment the width of the lower nacelle tangs 132 may be arranged such that the tangs 132 are received within the inner mounting slots 136 in the lower nacelle mounts 128, 130 (see FIG. 7A). In another embodiment, such as for a larger nacelle, the width of the lower nacelle tangs 132 may be arranged such that the tangs 132 are received within the outer mounting slots 136 in the lower nacelle mounts 128, 130 (see FIG. 7B). The ability of the lower nacelle mounts 128, 130 of the transport frames 100, 102 to accommodate lower nacelle tangs 132 of different widths allows the transport frames 100, 102 to be used on nacelles of different sizes. This is an improvement over many transport frames, which are specific for the particular nacelle being transported.

Figure 8A:
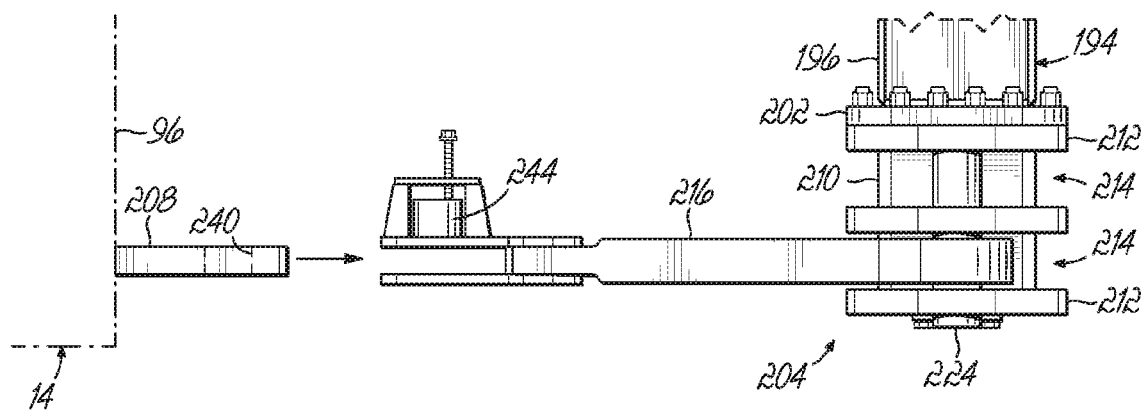
FIGS. 8A-8C illustrate top views of a nacelle connecting to upper nacelle mounts on the transport frame shown in FIG. 4 at different widths.
Figure 8B:
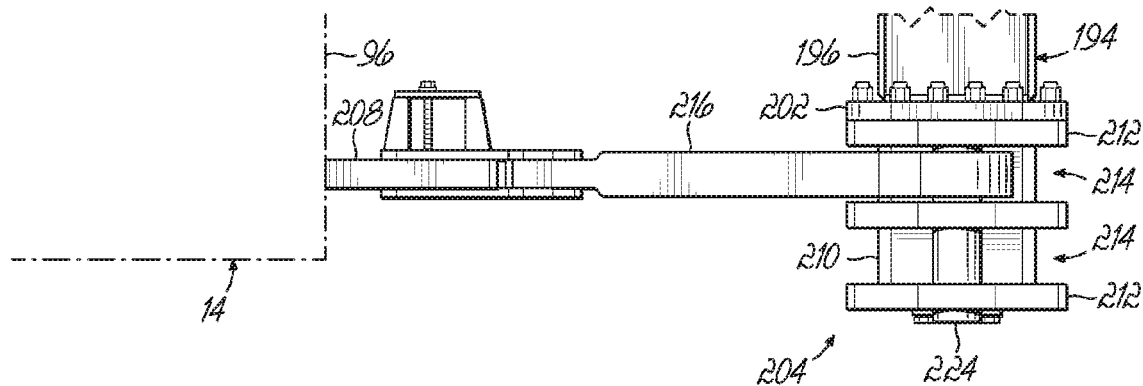
Figure 8C:
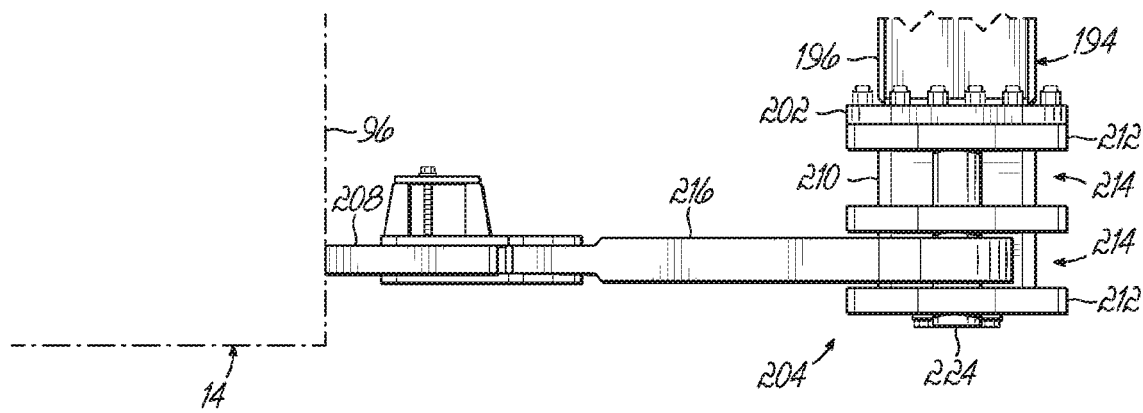

With the transport frames 100, 102 securely coupled to the lower tangs 132 of the nacelle 14, the transport frames 100, 102 may be coupled to the upper tangs 208, which are attached to and extend away from the front end and rear end of the nacelle 14. In an exemplary embodiment, the upper nacelle tangs 208 include an opening 240. A front tie rod 216 may be coupled to the upper nacelle mounts 204, 206 and to the upper nacelle tangs 208. In this regard and as illustrated in FIG. 8A, the front tie rod 216 may include opposed ends having openings. One end of the front tie rods 216 may be positioned relative to the upper nacelle mounts 204, 206 such that the opening at that end of the tie rods 216 aligns with the array of openings 222 in the upper nacelle mounts 204, 206. The lock pins 224 may be positioned in the array of openings 222 so as to extend through the opening in the front tie rods 216 to thereby secure the front tie rods 216 to the front transport frame 100. The other end of the tie rod 216 may extend to the upper nacelle tangs 208 such that the openings in the front tie rods 216 align with the opening 240 in the upper tangs 208 of the nacelle 14. A lock pin 244 may then be inserted through the openings 240 to secure the front tie rods 216 to the nacelle 14.

A similar approach may be used to secure the rear transport frame 102 to the upper tangs 208 of the nacelle 14. However, the rear tie rods 216a (see FIG. 1) used to connect the upper nacelle mounts 204, 206 to the upper tangs 208 of the nacelle 14 may be slightly different from the front tie rods 216 used with the front transport frame 100. More particularly, the rear tie rods 216a may be generally shorter than the front tie rods 216, but otherwise are similar to each other. Thus, each transport frame 100, 102 may be provided with both types of tie rods 216, 216a and the appropriate tie rod may be used to couple the transport frame 100, 102 to the nacelle 14 depending on whether the transport frame 100, 102 is being used at the front or rear of the nacelle 14. In an alternative embodiment, the tie rods may be adjustable (e.g., such as with a telescoping rod arrangement) such that the length of the tie rod may be varied to fit the either the front or rear transport frame 100, 102.

As noted above, the transport frames 100, 102 are configured to be used on nacelles of different sizes. More particularly, similar to the lower nacelle tangs 132, the upper nacelle tangs 208 will generally be spaced apart by a width that varies depending on the size of the nacelle. For example, a first nacelle of a first size will generally have the upper nacelle tangs 208 separated by a first width, and a second nacelle larger than the first nacelle will generally have the upper nacelle tangs 208 separated by a second width larger than the first width. The upper nacelle mounts 204, 206 are configured to accommodate the different widths of the nacelles. By way of example, in one embodiment the width of the upper nacelle tangs 208 may be arranged such that the tangs 208 are received within the inner mounting slots 214 in the upper nacelle mounts 204, 206 (see FIG. 8B). In another embodiment, such as for a larger nacelle, the width of the upper nacelle tangs 208 may be arranged such that the tangs 208 are received within the outer mounting slots 214 in the upper nacelle mounts 204, 206 (see FIG. 8C). The ability of the upper nacelle mounts 204, 206 of the transport frames 100, 102 to accommodate upper nacelle tangs 208 of different widths allows the transport frames 100, 102 to be used on nacelles of different sizes.

As described above, the transport frames 100, 102 are configured to accommodate nacelles of different sizes by providing some variability in a width direction of the nacelles. In other words, by engaging the lower and upper nacelle tangs 132, 208 with different mounting slots 136, 214 in the lower and upper nacelle mounts 128, 130, 204, 206, the transport frames 100, 102 may accommodate nacelles of different sizes. In another exemplary embodiment, the transport frames 100, 102 may be configured to accommodate nacelles of different sizes by providing some variability in a height direction of the nacelles. More particularly, the upper nacelle tangs 208 will generally be spaced from the lower nacelle tangs 132 by a height that varies depending on the size of the nacelle. For example, a first nacelle of a first size will generally have the lower nacelle tangs 132 and the upper nacelle tangs 208 separated by a first height, and a second nacelle larger than the first nacelle will generally have the lower nacelle tangs 132 and the upper nacelle tangs 208 separated by a second height greater than the first height. In one aspect, the spacing between the lower nacelle mounts 128, 130 and the upper nacelle mounts 204, 206 may be configured to accommodate the different heights of the nacelles.

Figure 9A:
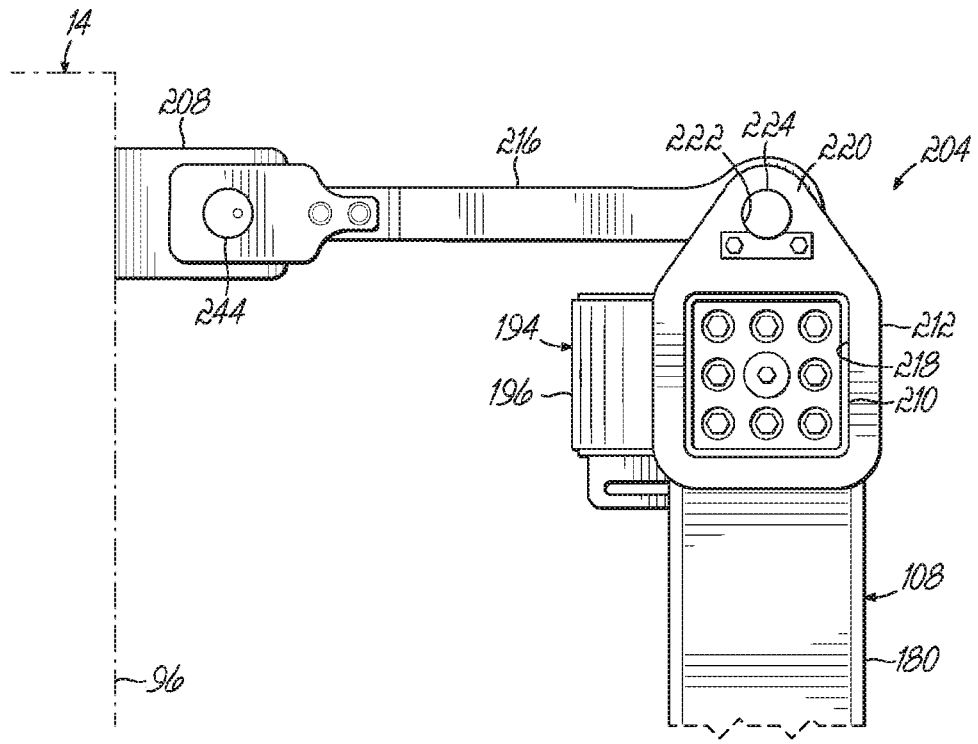
FIGS. 9A and 9B illustrate side elevation views of a nacelle connecting to upper nacelle mounts on the transport frame shown in FIG. 4 at different heights.
Figure 9B:
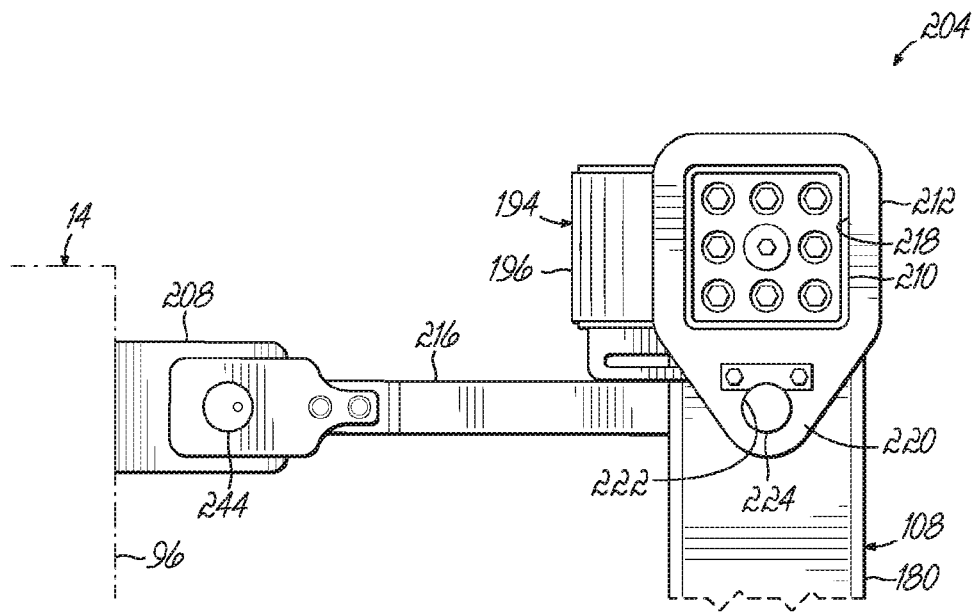

By way of example, in one embodiment the arrangement of the lower nacelle mounts 128, 130 relative to, for example, the base support 110 may be fixed, and the lower nacelle mounts 128, 130 are configured to receive the lower nacelle tangs 132 of the nacelle 14 in the manner described above. The ability to accommodate different heights between the lower and upper nacelle tangs 132, 208 may be achieved by manipulating the arrangement of the upper nacelle mounts 204, 206 on the outboard beam sections 198, 200 of the upper cross beam 194. More particularly, as explained above the upper nacelle mounts 204, 206 may be coupled to the attachment flanges 202 such that the tabs 220 extend upwardly and the array of openings 222 that receive the tie rod 216 is positioned above the upper cross beam 194 (see FIG. 9A). When the upper nacelle mounts 204, 206 are in this orientation, the upper nacelle mounts 204, 206 may be coupled to upper nacelle tangs 208 that are spaced from the lower nacelle tangs 132 by a first height. In another embodiment, such as for a smaller nacelle, the upper nacelle mounts 204, 206 may be coupled to the attachment flanges 202 such that the tabs 220 extend downwardly and the array of openings 222 that receive the tie rod 216 is positioned below the upper cross beam 194 (see FIG. 9B). When the upper nacelle mounts 204, 206 are in this orientation, the upper nacelle mounts 204, 206 may be coupled to upper nacelle tangs 208 that are spaced from the lower nacelle tangs 132 by a second height less than the first height. The ability to attach the upper nacelle mounts 204, 206 to the transport frames 100, 102 in two different orientations allows the transport frames 100, 102 to be used on nacelles of different sizes (and different separation heights between the lower and upper nacelle tangs 132, 208). Thus, the transport frames 100, 102 are able to accommodate both width and height variations in the nacelle tangs 132, 208 due to nacelles being of different sizes.

In the above, the various frame sections 104, 106, 108 of the transport frame 100, 102 were assembled prior to the nacelle 14 being coupled to the transport frames 100, 102. Embodiments of the invention, however, are not so limited. For example, in one embodiment, the nacelle 14 (e.g., the lower tangs 132) may be coupled to the lower nacelle mounts 128, 130 of the bottom frame section 104 without the intermediate frame section or top frame section 106, 108 being assembled. Such an arrangement, for example, may minimize damaging the nacelle 14 or the transport frames 100, 102 during coupling. After the nacelle 14 is secured to the bottom frame section 104, such as in the manner described above, the intermediate frame section 106 and top frame section 108 may be coupled to the bottom frame section 104 to form the assembled transport frames 100, 102. The tie rods 216, 216a may then be used to couple the upper nacelle mounts 206, 208 to the upper tangs 208 of the nacelle 14. Thus, there may be several alternative ways to assembly and/or couple the transport frames 100, 102 to the ends of the nacelle 14 which remain within the scope of the present invention.

In any event, after the transport frames 100, 102 are coupled to the ends 96, 98 of the nacelle 14, a number of options may be available. For example, if the nacelle 14 is not ready to be transported to an installation site, the nacelle 14 may be placed in storage with the transport frames 100, 102 remaining attached to the nacelle 14. In one embodiment, the transport frames 100, 102 may support the nacelle 14 directly on the ground or storage surface. In an alternative embodiment, a plurality of support posts or pylons may support the nacelle 14 and transport frames 100, 102 off the ground or support surface. When the nacelle 14 is ready to be transported to a wind turbine installation site, the nacelle 14 and transport frames 100, 102 may be placed in a loading area by a crane, cart or other lifting/transport vehicle. The transport system 30 may then be coupled to nacelle 14 for transport over the network of roads 48. More particularly, the front carrier 36 may be positioned adjacent to the front transport frame 100. The movable frame 42 may then be adjusted to allow the attachment interface 44 (e.g., the attachment elements 62, 66) to mount to the lower carrier interface 148, such as at interface plate 150, and to the upper carrier interface, such as at the interface plate of the front transport frame 100. In a similar manner, the rear carrier 38 may be positioned adjacent to the rear transport frame 102. The movable frame 42 may then be adjusted to allow the attachment interface 74 (e.g., the attachment elements 88, 92) to mount to the lower carrier interface 148, such as at interface plate 150, and to the upper carrier interface, such as at the interface plate of the rear transport frame 102. The movable frames 72 may then be adjusted to lift the nacelle 14 from the ground or pylons and position the nacelle 14 for transport along the network of roads 48.

As with current "world adaptor" arrangements, during the transport of the nacelle 14, it may be desired or necessary to adjust the position of the nacelle 14 in order to avoid various obstacles along the transport route. In that event, the movable frames 42 on the front and rear carriers 36, 38 may be manipulated in order to vary the position of the nacelle 14 and allow it to pass by the obstacles. When the nacelle 14 arrives at the installation site, the nacelle 14 may be unloaded with the transport frames 100, 102 remaining connected to the nacelle 14. By way of example, if the transport system 30 is used to transport the nacelle 14 to the installation site or on the final leg of the route to the installation site, the movable frames 42, 72 on the front and rear carriers 36, 38 may be manipulated to lower the nacelle 14 onto the ground, pylons or other support surface. At this point, a crane or other lifting device may lift the nacelle 14 from the transport frames 100, 102.

In one aspect of the invention, the transport frames 100, 102 may be arranged so as to minimize any potential damage to the nacelle 14 during the unloading process, and more particularly during the lifting of the nacelle 14 from the transport frames 100, 102. In this regard, the intermediate frame section 106 and the top frame section 108 may be moved away from the nacelle 14 such that the nacelle 14 cannot make contact with these portions of the transport frames 100, 102 during the lifting of the nacelle 14. More particularly, the tie rods 216, 216a may be disengaged from the upper nacelle tangs 208 (and perhaps also the upper nacelle mounts 204, 206) and the intermediate and top frame sections 106, 108 pivoted away from the ends of the nacelle 14 due to the configuration of hinge connection 170 that defines pivot 172. For example, the lock 176 may be disengaged and the intermediate and top frame sections 106, 108 rotated about pivot axis 174 away from the nacelle 14. Moreover, the lock pins 144 that secure the lower nacelle tangs 132 to the lower nacelle mounts 128, 130 may be removed such that the nacelle 14 rests on the support pins 146. In this way, the nacelle 14 is free to be lifted from the transport frames 100, 102, and as the nacelle is lifted it does not make any contact with the intermediate and top frame sections 106, 108 of the transport frames. Thus, the likelihood of damage to the nacelle 14 is reduced.

Figure 10A:
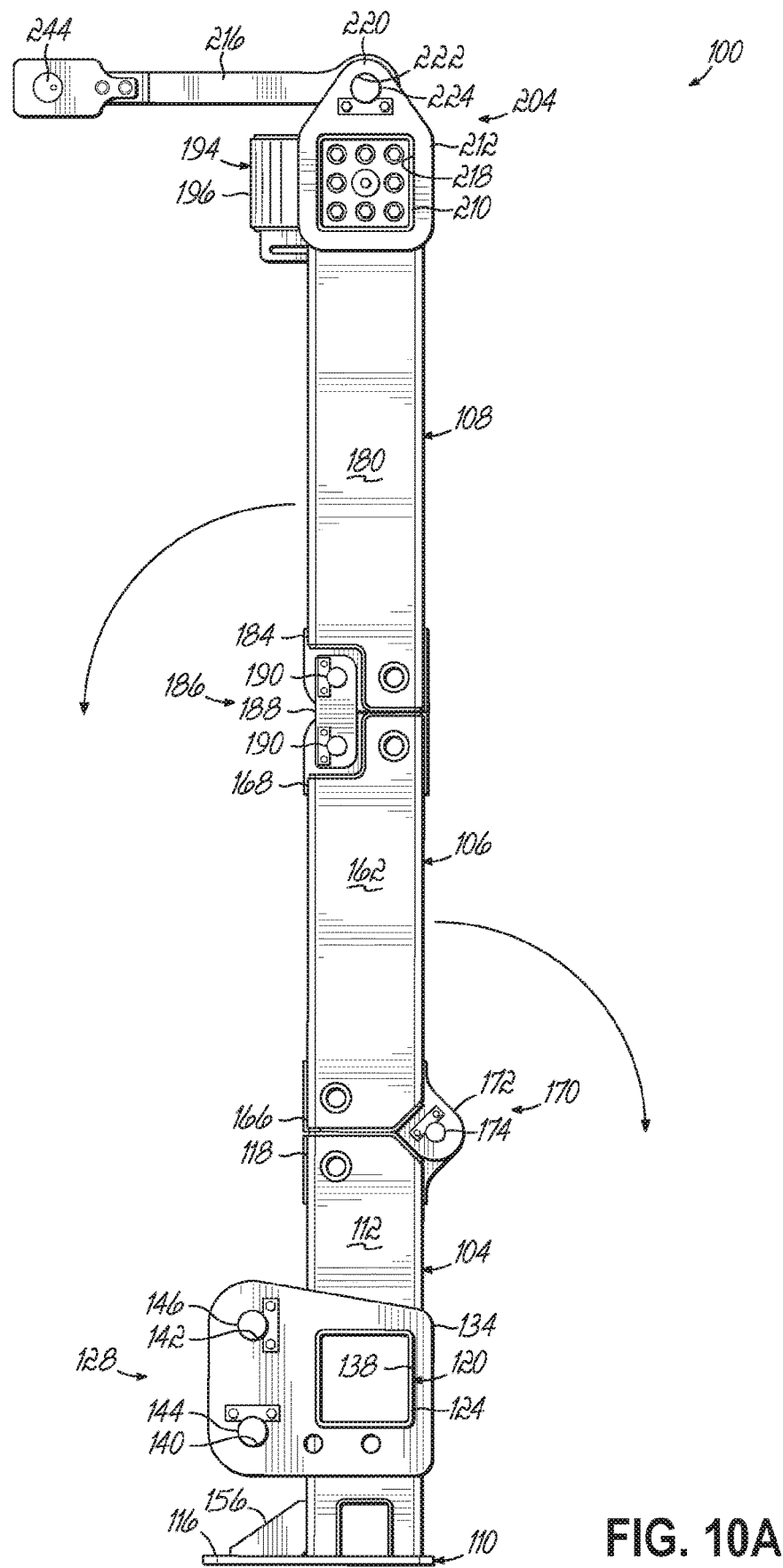
FIGS. 10A and 10B are side elevation views of the transport frame shown in FIG. 4 in an expanded and collapsed state.
Figure 10B:
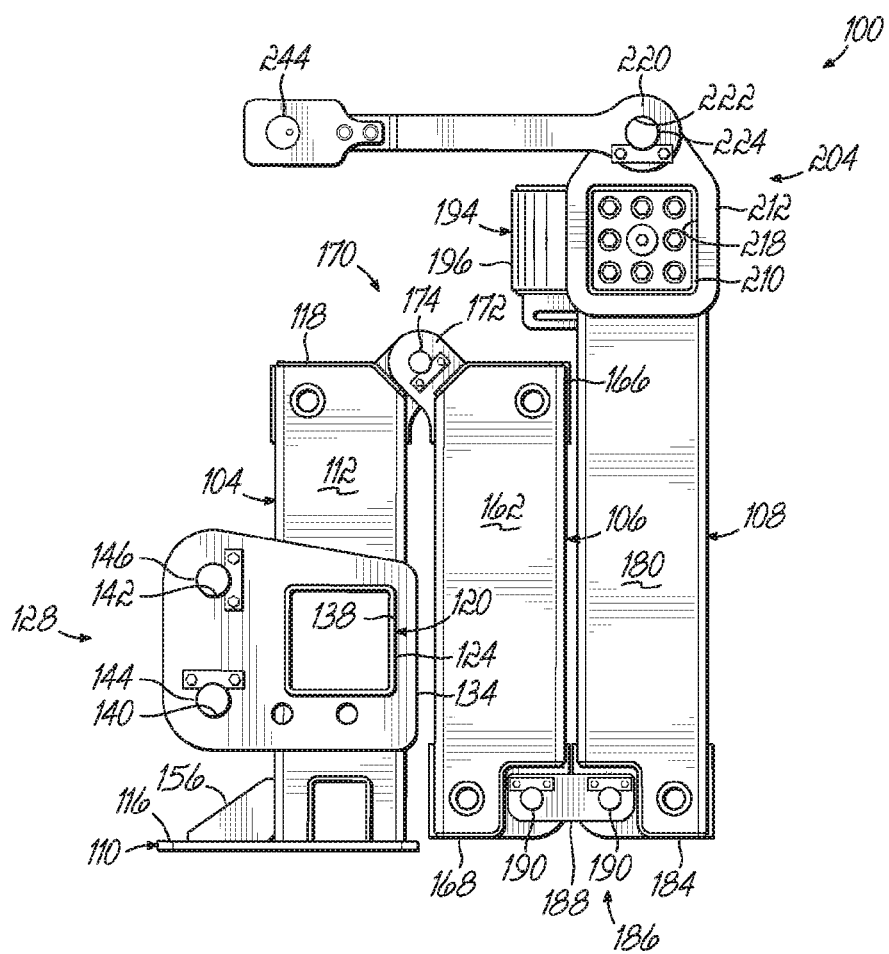

In another advantageous aspect of the invention, once the nacelle 14 is removed from the transport frames 100, 102 at the installation site, the transport frames 100, 102 may be configured for transport back to the manufacturing or storage facility for use with another nacelle. As discussed above, many conventional transport frames are large bulky items that occupy a significant amount of space during transport. To address this particular shortcoming and as illustrated in FIGS. 10A and 10B, the transport frames 100, 102 are configured to have an expanded, in-use state and a collapsed, storage/transport state. In the expanded state, the transport frames 100, 102 are in their in-use position, such as being attached to the ends of the nacelle 14, as illustrated in the figures and described above. In the collapsed state, however, the frame sections 104, 106, 108 are juxtapositioned relative to each other to have a compact configuration that occupies significantly less space when in storage or when in transport back to a manufacturing facility.

More particularly, in the collapsed position, the locks 176 may be disengaged (if not already done so during the unloading process) and the intermediate frame section 106 may be rotated about the pivot axis 174 of the hinged connection 170 such that the main beams 162, 164 of the intermediate frame section 106 are generally to the side of the main beams 112, 114 of the bottom frame section 104 (as opposed to above the main beams 112, 114 in an in-line manner). Additionally, the hinged connection 186 between the intermediate and top frame sections 106, 108 may be manipulated to provide a fold between those two sections. More particularly, the lock 192 may be disengaged and the top frame section 108 may be rotated about the pivot axes 190 of the hinged connection 186 such that the main beams 180, 182 of the top frame section 108 are generally to the side of the main beams 162, 164 of the intermediate frame section 106 (as opposed to above the main beams 162, 164 in an in-line manner). The folded configuration is shown in FIG. 10B. Folding of the frame sections 104, 106, 108 provides a compact arrangement of the transport frames 100, 102 that allows the transport frames 100, 102 to be more easily stored at a site when the transport frames 100, 102 are not in use. Moreover, the compact arrangement of the transport frames 100, 102 further allows the transport frames 100, 102 to be transported from an installation site back to a manufacturing facility or storage facility in a more efficient, low-cost manner.

Figure 11:
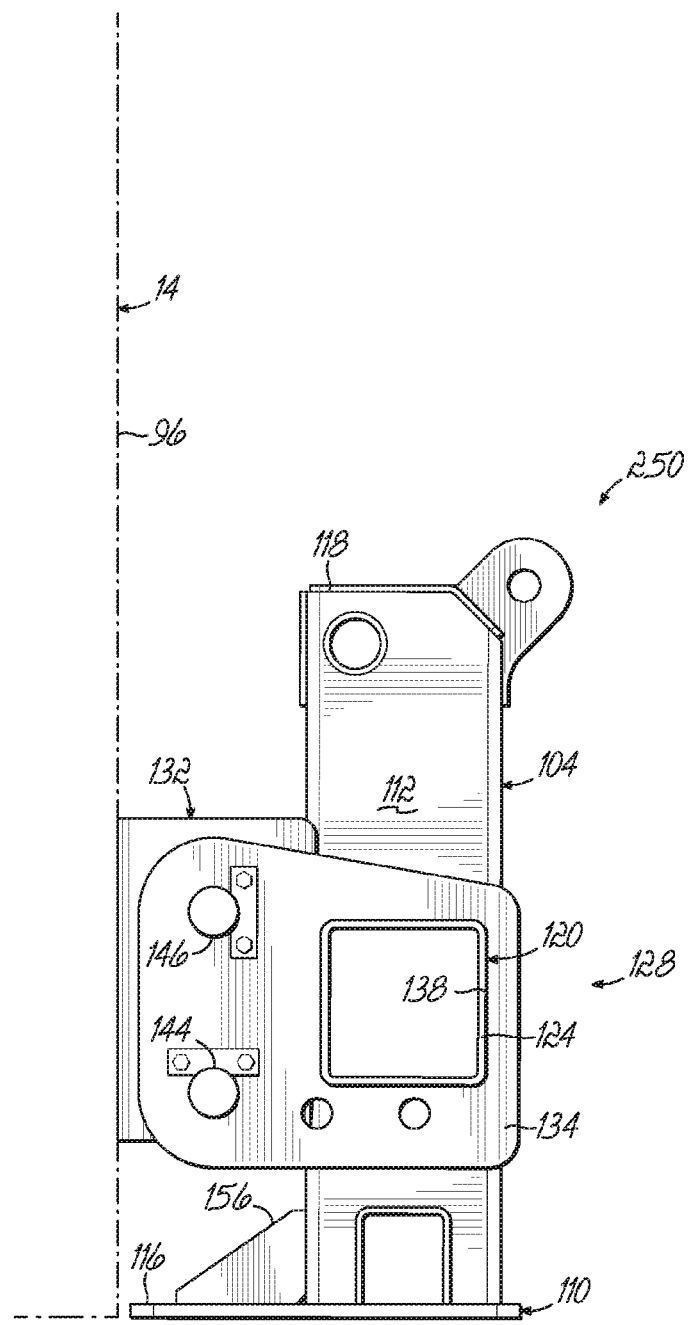
FIG. 11 illustrates a production tool for assembling a nacelle in a manufacturing facility.

The transport frames 100, 102 as described herein may provide additional benefits and advantages to manufacturers, transporters, etc. For example, in one embodiment and as illustrated in FIG. 11, the bottom frame section 104 described above may be used as a production tool 250 during the assembly of the nacelle 14. More particularly, the nacelle 14 generally includes a rigid framework and an outer cover to define an interior. The interior includes many components for the operation of the wind turbine 10 that may be installed during the manufacture of the nacelle 14. In other words, the nacelle 14 has many pre-assembled components prior to the nacelle being transported to a wind turbine installation site. Such an approach simplifies field assembly of the nacelle 14 into the wind turbine 10. Thus, it may be advantageous to assemble as much of the nacelle 14 in the factory setting as possible. To this end, the framework of the nacelle 14 may be assembled and supported within the factory environment on front and rear production tools 250 during the build out of the nacelle 14. The production tools 250 help in supporting and moving the nacelle 14 along a production line in the factory setting.

Such a production tool 250 would in the normal course be removed from the nacelle 14 after the nacelle is assembled within the factory. That nacelle might then be moved to a location where the transport frames 100, 102 are coupled to the forward and rear ends 96, 98 of the nacelle 14 in the manner fully described above. In an alternative embodiment, however, the production tools 250 may take the form of the bottom frame sections 104 of the transport frames 100, 102. Thus, when the nacelle 14 is assembled within the factory (to the extent dictated by the design), the production tools 250 may remain connected to the nacelle 14. That assembly may then be moved to a storage location with the production tools 250 (i.e., the bottom frame sections 104) attached thereto. When the nacelle 14 is being prepared for transport to an installation site, the intermediate and top frame sections 106, 108 may then be coupled to the bottom frame section 104 to complete the assembly of the transport frames 100, 102. Alternatively, prior to the nacelle 14 being placed in storage, the intermediate and top frame sections 106, 108 may be coupled to the bottom frame section 104 to complete the assembly of the transport frames 100, 102. In any event, it may be advantageous to have a portion of the transport frames 100, 102 be used as production tools 250 during the assembly process of the nacelle 14 in the manufacturing facility. The modular nature of the transport frames 100, 102 provides such a feature.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A transport frame for the transport of a nacelle to a wind turbine installation site, comprising:
    a plurality of nacelle mounts for attaching the transport frame to the nacelle including a pair of lower nacelle mounts and a pair of upper nacelle mounts,
    wherein each of the lower nacelle mounts includes a plurality of lower attachment points for attaching the lower nacelle mounts to the nacelle, the plurality of lower attachment points on each of the lower nacelle mounts allowing the transport frame to attach to the nacelle at a plurality of different widths,
    wherein each of the upper nacelle mounts includes a plurality of upper attachment points for attaching the upper nacelle mounts to the nacelle, the plurality of upper attachment points on each of the upper nacelle mounts allowing the transport frame to attach to the nacelle at a plurality of different widths,
    wherein the pair of lower nacelle mounts and the pair of upper nacelle mounts are adjustably positioned relative to each other on the transport frame to allow the transport frame to attach to the nacelle at a plurality of different heights,
    wherein the ability of the transport frame to attach to the nacelle at a plurality of different widths and a plurality of different heights allows the transport frame to be used on nacelles having different sizes,
    wherein the transport frame is movable between an expanded state and a collapsed state, and
    wherein the transport frame further comprises:
        a bottom frame section including a lower cross beam, the pair of lower nacelle mounts being associated with the lower cross beam;
        and intermediate frame section; and
        a top frame section including an upper cross beam, the pair of upper nacelle mounts being associated with the upper cross beam,
        wherein each frame section includes a pair of main beams, the main beams being coupled together at the joint between adjacent frame sections.

2. The transport frame of claim 1, wherein each of the pair of lower nacelle mounts comprises:
    a beam section; and
    a plurality of mounting plates coupled to and spaced apart along the beam section, wherein mounting slots are formed between adjacent mounting plates that define the plurality of lower attachment points.

3. The transport frame of claim 2, wherein the plurality of mounting plates further comprises:
    a lower array of aligned openings configured to receive a support pin for supporting the nacelle; and
    an upper array of aligned openings configured to receive a lock pin for securing the lower nacelle mount to the nacelle.

4. The transport frame of claim 2, wherein each of the pair of lower nacelle mounts includes three or more mounting plates and two or more mounting slots.

5. The transport frame of claim 1, wherein each of the pair of lower nacelle mounts is fixedly positioned on the transport frame.

6. The transport frame of claim 1, wherein each of the upper nacelle mounts comprises:
   a beam section; and
   a plurality of mounting plates coupled to and spaced apart along the beam section, wherein mounting slots are formed between adjacent mounting plates that define the plurality of upper attachment points.

7. The transport frame of claim 6, wherein the plurality of mounting plates further comprises:
   a tab extending from an end of each of the plurality of mounting plates; and
   an array of aligned openings in the tab of each of the plurality of mounting plates configured to receive a lock pin for securing the upper nacelle mount to the nacelle.

8. The transport frame of claim 6, wherein each of the pair of upper nacelle mounts includes three or more mounting plates and two or more mounting slots.

9. The transport frame of claim 1, wherein each of the pair of upper nacelle mounts is adjustably positioned on the transport frame.

10. The transport frame of claim 9, wherein each of the pair of upper nacelle mounts is positionable on the transport frame in a first orientation where the pair of lower nacelle mounts and the pair of upper nacelle mounts are separated by a first height, and wherein each of the pair of upper nacelle mounts is positionable on the transport frame in a second orientation where the pair of lower nacelle mounts and the pair of upper nacelle mounts are separated by a second height different from the first height.

11. The transport frame of claim 1, further comprising a pair of tie rods, wherein each tie rod is configured to be coupled to a respective one of the pair of upper nacelle mounts for attaching the upper nacelle mounts to the nacelle.

12. The transport frame of claim 1, wherein the transport frame includes a plurality of frame sections hingedly coupled together to form the transport frame, and wherein the transport frame is foldable at the hinge joints between adjacent frame sections.

13. The transport frame of claim 1, wherein the bottom frame section is a production tool used in a manufacturing facility for the assembly of the nacelle.

14. The transport frame according to claim 1, further comprising one or more carrier interfaces for attachment to a transport system for transporting the nacelle to the wind turbine installation site.

15. An assembly, comprising:
   a nacelle for a wind turbine having a front end and a rear end;
   a front transport frame attached to the front end of the nacelle; and
   a rear transport frame attached to the rear end of the nacelle,
   wherein the front and rear transport frames are each according to claim 1.

16. A transport system for transporting a nacelle over a network of roads to a wind turbine installation site, comprising:
   a tractor;
   a trailer having a front carrier and a rear carrier, the front carrier attached to the tractor and including a front attachment interface, and the rear carrier including a rear attachment interface; and
   the assembly of claim 15, wherein the front attachment interface of the front carrier is attached to the front transport frame, and the rear attachment interface of the rear carrier is attached to the rear transport frame.

17. A method of transporting a nacelle over a network of roads to a wind turbine installation site, comprising:
   providing a front transport frame and a rear transport frame, each of the front and rear transport frames according to claim 1;
   attaching the front transport frame to a front end of the nacelle;
   attaching the rear transport frame to a rear end of the nacelle;
   attaching the front and rear transport frames to a transport system; and
   transporting the nacelle to the wind turbine installation site.

18. The method of claim 17, further comprising:
   detaching the front and rear transport frames from the front end and rear end of the nacelle; and
   attaching the front and rear transport frames to the front and rear ends of another nacelle,
   wherein the another nacelle has a size different from the nacelle.

19. The method of claim 18, wherein the attachment of the another nacelle to the front and rear transport frames is at different attachment points of the lower and upper nacelle mounts as compared to the attachment of the nacelle to the attachment points of the lower and upper nacelle mounts of the front and rear transport frames.

20. A method for transporting a nacelle over a network of roads to a wind turbine installation site, comprising:
   providing a front transport frame, the front transport frame having an expanded state and a collapsed state;
   providing a rear transport frame, the rear transport frame having an expanded state and a collapsed state;
   attaching the front transport frame to a front end of the nacelle, the front transport frame being in the expanded state when attached to the nacelle;
   attaching the rear transport frame to a rear end of the nacelle, the rear transport frame being in the expanded state when attached to the nacelle;
   transporting the nacelle to the wind turbine installation site;
   removing the front and rear transport frames from the nacelle at the wind turbine installation site; and
   positioning the front and rear transport frames in the collapsed state,
   wherein the front and rear transport frames each include a plurality of frame sections coupled together at at least one hinge joint to form their respective transport frames, wherein positioning the front and rear transport frames in the collapsed state further comprises folding the front and rear transport frames at the at least one hinge joint between adjacent frame sections, and
   wherein the at least one hinge joint defines a pivot axis about which the plurality of frame sections fold that is parallel to a width dimension of the respective transport frames.

21. The method of claim 20, further comprising transporting the front and rear transport frames away from the wind turbine installation site in the collapsed state.

22. A method of handling a nacelle for a wind turbine, comprising:

providing a pair of production tools at a manufacturing facility;

assembling the nacelle at the manufacturing facility using the pair of production tools, one production tool being positioned at a front end of the nacelle and the other production tool being positioned at a rear end of the nacelle;

coupling one or more frame sections to each of the pair of production tools, wherein the production tools and the one or more frame sections forming a front transport frame attached to the front end of the nacelle and a rear transport frame attached to the rear end of the nacelle; and transporting the nacelle to a wind turbine installation site using the front and rear transport frames.

23. The method of claim 22, further comprising:

placing the nacelle and production tools in storage; and coupling the one or more frame sections to the production tools when the nacelle is ready for transport to the wind turbine installation site.

\* \* \* \* \*